(12) United States Patent
Sato et al.

(10) Patent No.: US 7,028,410 B2
(45) Date of Patent: Apr. 18, 2006

(54) PORTABLE TERMINAL

(75) Inventors: Hiroyuki Sato, Tokyo (JP); Akihiro Miyashita, Kawasaki (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 10/504,350

(22) PCT Filed: Feb. 26, 2003

(86) PCT No.: PCT/JP03/02143

§ 371 (c)(1),
(2), (4) Date: Aug. 12, 2004

(87) PCT Pub. No.: WO03/081176

PCT Pub. Date: Oct. 2, 2003

(65) Prior Publication Data

US 2005/0143148 A1      Jun. 30, 2005

(30) Foreign Application Priority Data

Mar. 25, 2002   (JP) .............................. 2002-083840

(51) Int. Cl.
*G01C 17/38* (2006.01)
(52) U.S. Cl. .................... 33/356; 33/355 R; 455/575.1
(58) Field of Classification Search ............. 33/355 R, 33/356, 355 D, 1 E, 363 R, 220; 701/220
See application file for complete search history.

(56) References Cited

U.S. PATENT DOCUMENTS 5,872,557 A  *  2/1999  Wiemer et al. ............. 345/156
5,953,683 A  *  9/1999  Hansen et al. ................ 702/95
6,044,257 A  *  3/2000  Boling et al. ............ 455/404.2
6,132,391 A  * 10/2000  Onari et al. ................. 600/595
6,321,158 B1 * 11/2001  DeLorme et al. ........... 701/201
6,466,198 B1 * 10/2002  Feinstein ..................... 345/158
6,470,264 B1 * 10/2002  Bide ........................... 701/207
6,536,123 B1 *  3/2003  Tamura ........................ 33/356

(Continued)

FOREIGN PATENT DOCUMENTS

JP           10-170301        6/1998

(Continued)

*Primary Examiner*—Yaritza Guadalupe
(74) *Attorney, Agent, or Firm*—Pearne & Gordon LLP (57) ABSTRACT

The present invention aims to achieve that geomagnetism can be sensed in high precision while eliminating an adverse influence by magnetic noise with respect to a geomagnetic sensor provided in a housing, and correct azimuth information can be acquired.

A portable terminal apparatus according to the present invention is arranged by that both a first housing (11) and a second housing (12) are coupled to each other by way of a hinge portion (13) under pivotable condition, a geomagnetic sensor (33) is provided on a circuit board (32) in the second housing (12), and also, a speaker (19) is provided on the side of a rear surface thereof. Both this geomagnetic sensor (33) and a speaker (19) corresponding to a component for generating magnetic noise which gives an adverse influence with respect to the geomagnetic sensor (33) are provided in the vicinity of each other within the same second housing (12), and both the members are arranged on the same plane. In this structure, since a magnetic force line (35) which is caused by magnetic noise generated from a magnet (19*a*) of the speaker (19) is intersected with respect to the geomagnetic sensor (33) at a right angle, and thus, a horizontal direction component thereof is not produced, the geomagnetic sensor (33) can correctly sense the geomagnetism without being adversely influenced by the magnetic noise.

10 Claims, 9 Drawing Sheets

U.S. PATENT DOCUMENTS

| | | | |
|---|---|---|---|
| 6,836,971 B1* | 1/2005 | Wan | 33/356 |
| 6,842,991 B1* | 1/2005 | Levi et al. | 33/356 |
| 6,904,358 B1* | 6/2005 | Nohara et al. | 701/201 |
| 6,946,991 B1* | 9/2005 | Hasebe et al. | 342/357.08 |
| 2002/0014016 A1* | 2/2002 | Kato | 33/355 R |
| 2002/0061755 A1* | 5/2002 | Nohara et al. | 455/457 |
| 2003/0069693 A1* | 4/2003 | Snapp et al. | 701/213 |
| 2004/0133347 A1* | 7/2004 | Britt | 702/1 |
| 2005/0072011 A1* | 4/2005 | Miyashita et al. | 33/355 R |
| 2005/0150122 A1* | 7/2005 | Cho et al. | 33/356 |

FOREIGN PATENT DOCUMENTS

| | | |
|---|---|---|
| JP | 10-178481 | 6/1998 |
| JP | 11-214804 | 8/1999 |
| JP | 2002-31541 | 1/2002 |
| JP | 2002-196055 | 7/2002 |
| JP | 2002-237874 | 8/2002 |

* cited by examiner

PORTABLE TERMINAL

TECHNICAL FIELD

The present invention relates to a portable terminal apparatus such as a portable telephone which can be carried by a person. More specifically, the present invention is directed to a portable terminal apparatus equipped with a GPS receiving unit for receiving GPS signals transmitted from GPS (Global Positioning System) satellites so as to acquire positional information.

BACKGROUND ART

Recently, in automobile navigation systems, positional information providing functions have been provided by which GPS signals transmitted from GPS satellites are received so as to acquire positional information of the own navigation systems and to indicate present positions on maps. Very recently, even in portable terminal apparatus such as portable telephones, such notification services as positional information and time instants may be provided by utilizing the GPS satellites.

Since GPS signals are employed, correct positional information such as latitude/longitude as to present positions may be acquired in higher precision. However, in such a case that a user travels by receiving only such GPS signals, the user cannot grasp that this traveling user is presently directed to which direction. In order to increase an additional value of positional information services provided in portable terminal apparatus, similar to automobile navigation systems, such a function is desirably employed. That is, while a geomagnetic sensor is employed so as to also acquire azimuth information, a map is rotated to be displayed in conjunction with such a direction to which a user is presently directed when a present position is displayed on the map.

However, as previously explained, in the case that a geomagnetic sensor is provided in a portable terminal apparatus so as to acquire azimuth information, there is such a risk that the geomagnetic sensor is adversely influenced by magnetic fields generated from other components, and thus, cannot correctly sense the geomagnetism. Since a large number of components for generating magnetic noise such as a speaker are mounted within the portable terminal apparatus, and furthermore, the respective mounted components are provided in the vicinity of each other so as to make this portable terminal apparatus compact, this geomagnetic sensor is brought into such a condition that the geomagnetic sensor may be adversely and readily influenced by magnetic noise. Also, while the portable terminal apparatus is carried by the user, another adverse influence caused by externally-applied magnetization must be considered. As a consequence, in order to achieve stable performance of the geomagnetic sensor, both a component arrangement and a structure, capable of avoiding an adverse influence caused by peripheral magnetic fields other than the geomagnetism, must be employed, so that designing of these component arrangement and structure is largely restricted.

Figure 8:
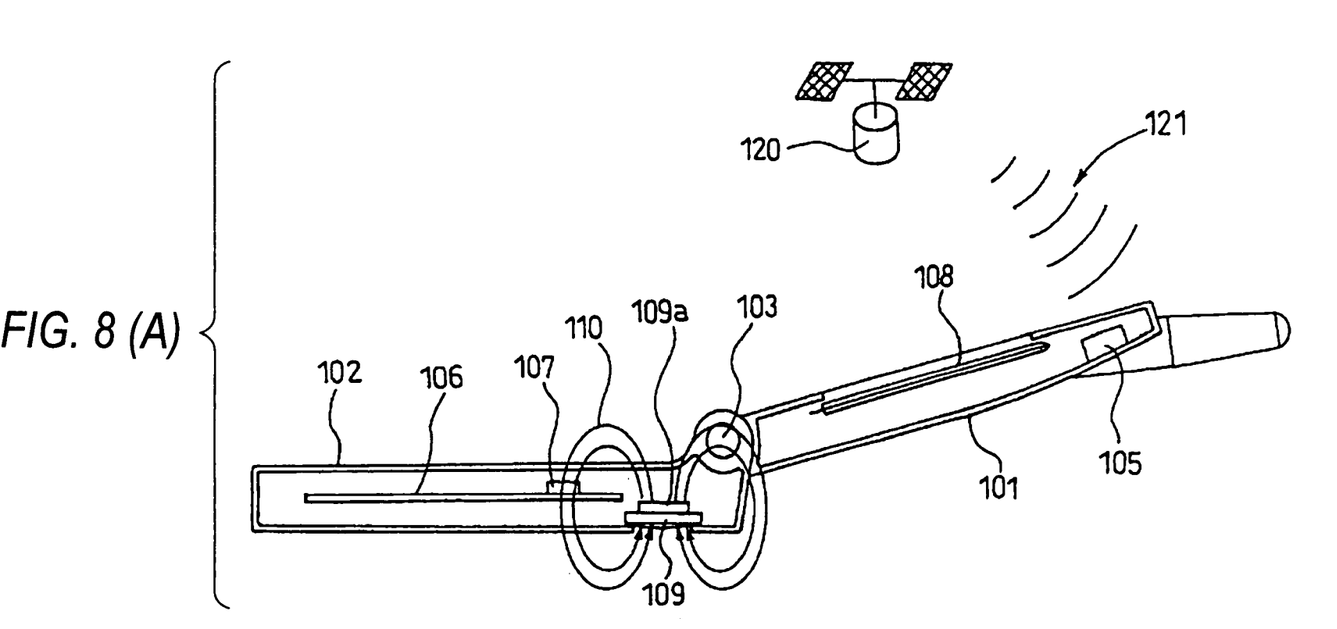
FIGS. 8(A) and 8(B) are explanatory diagrams for indicating a sectional view of a first structural example of a portable terminal apparatus in which both a GPS receiving unit and a geomagnetic sensor are provided.
Figure 9:
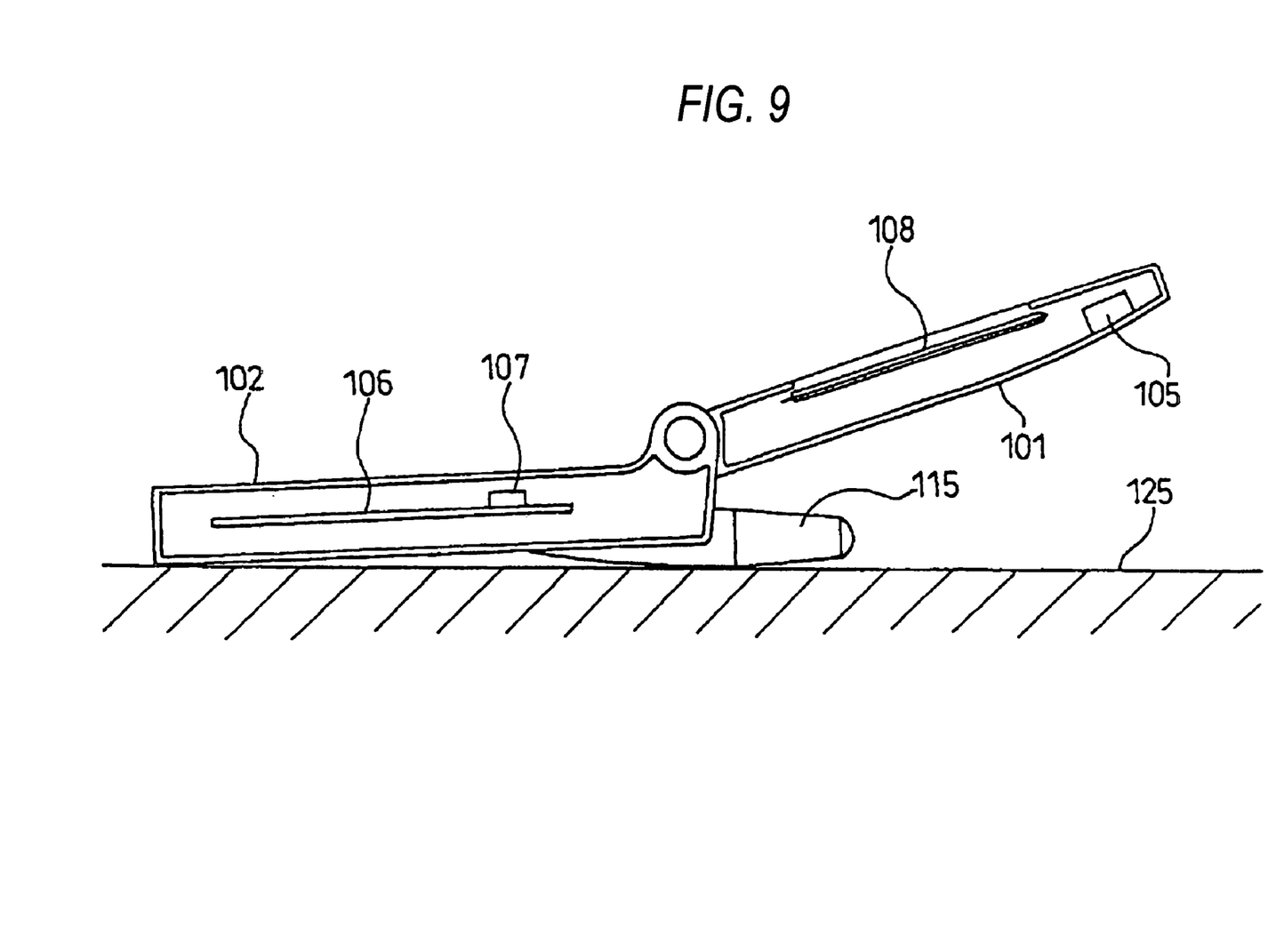
FIG. 9 is an explanatory diagram for indicating a sectional view of a first structural example of a portable terminal apparatus in which both a GPS receiving unit and a geomagnetic sensor are provided.

In this case, FIG. 8 and FIG. 9 shows a structural example of a portable terminal apparatus equipped with both a GPS receiving unit and a geomagnetic sensor. This structural example indicates such a construction which is applied to a portable telephone arranged in that both a first housing 101 and a second housing 102 can be folded at a hinge portion 103. As indicated in FIG. 8(A), a GPS receiving unit 105 is provided on the first housing 101. The GPS receiving unit 105 is equipped with both a GPS antenna and a receiving circuit, which may receive a GPS signal 121 transmitted from a GPS satellite 120 so as to acquire positional information of the own portable telephone. Also, a geomagnetic sensor 107 for sensing geomagnetism is provided on a circuit board 32 in the second housing 102. The circuit board 106 mounts thereon a high frequency circuit, a baseband circuit, a control circuit, and the like, and is stored in this second housing 102. As this geomagnetic sensor 107, such a sensor is employed which is equipped with magnetic field detecting capabilities for two-axial components of the horizontal direction. Based upon the positional information acquired by the above-explained GPS receiving unit 105 and the azimuth information acquired by the geomagnetic sensor 107, the positional information and a time instant may be displayed on the display unit 108 in combination with a map.

Also, a speaker 109 is provided as a built-in component in the second housing 102 in the vicinity of the geomagnetic sensor 107, while this speaker 109 produces ringing sound (telephone calling sound), and the like. Magnetic noise radiated from a magnet 109a of this speaker 109 is expressed by a magnetic force line 110. As indicated in FIG. 8(B), a tangential vector 111 of the magnetic force line 110 radiated from the speaker 109 with respect to the geomagnetic sensor 107 contains both a vertical-direction component 111a and a horizontal-direction component 111b of the magnetic force line. As a consequence, the geomagnetic sensor 107 may sense this horizontal-direction component 111b of the magnetic force line 110, and thus, there is such a problem that the geomagnetic sensor 107 may produce errors in the geomagnetic detecting operation by receiving the adverse influence of the peripheral magnetic force, and cannot correctly sense the geomagnetism.

To cancel the adverse influence caused by this peripheral magnetic force, the arranging construction must be changed, for instance, such a component for giving an adverse influence to the geomagnetic sensor is separated from this geomagnetic sensor. Also, a correcting function by way of software must be provided. Alternatively, such a function capable of de-energizing the magnetic noise other than the geomagnetism must be mounted. Since such a means is employed, various problems may occur, for example, the above-described arranging construct can be hardly employed in the actual apparatus, and the apparatus becomes bulky and complex. Thus, such a means can be hardly applied to portable terminal apparatus.

Also, as represented in FIG. 9, in such a structural case that an antenna 115 is provided on the side of the second housing 102, when the portable telephone is put on a desk 125, a bottom plane (namely, plane on the outer side) of the second housing 102 cannot become flat, so that the geomagnetic sensor 107 provided inside the second housing 102 is inclined with respect to the horizontal plane. When the geomagnetic sensor 107 is inclined at an angle larger than, or equal to a predetermined angle, an error may occur in the geomagnetic detecting operation. In particular, when the geomagnetic sensor 107 is adjusted (calibrated) prior to the geomagnetic detecting operation, if the geomagnetic sensor 107 is inclined, then there is such a problem that the adjustment of the geomagnetic sensor 107 cannot be correctly carried out but the sensing precision of the geomagnetism is lowered.

The present invention has been made to solve the above-described problems, and therefore, has an object to provide a portable terminal apparatus capable of detecting geomagnetism in higher precision and capable of acquiring correct azimuth information, while eliminating an adverse influence caused by magnetic noise with respect to a geomagnetic sensor provided in a housing of the portable terminal apparatus.

DISCLOSURE OF THE INVENTION

A portable terminal apparatus, according to the present invention, is featured by such a portable terminal apparatus comprising: a geomagnetic sensor for sensing geomagnetism; and azimuth measuring means for acquiring azimuth information based upon the sensed geomagnetism, in which both the geomagnetic sensor and a component for generating magnetic noise are arranged on the same plane within the same housing, while the magnetic noise generating component is positioned in the vicinity of the geomagnetic sensor and gives an influence to a function of the geomagnetic sensor.

With employment of the above-described construction, since both the geomagnetic sensor and the component for generating the magnetic noise such as a speaker are located on the same plane, the magnetic noise generated from the component such as the speaker is vertically entered into the geomagnetic sensor, so that the geomagnetic sensor is not adversely influenced in the horizontal direction. As a consequence, the geomagnetic sensor can sense the geomagnetism in higher precision without eliminating the adverse influence caused by the magnetic noise generated from other components, so that the correct azimuth information can be acquired.

Also, a portable terminal apparatus, according to the present invention, is featured by such a portable terminal apparatus comprising: a geomagnetic sensor for sensing geomagnetism; and azimuth measuring means for acquiring azimuth information based upon the sensed geomagnetism, in which both a first housing and a second housing are coupled to each other by way of a hinge portion in such a manner that the first and second housings can be opened/closed; the geomagnetic sensor is arranged within the first housing; a component for generating magnetic noise which gives an influence to a function of the geomagnetic sensor is arranged within the second housing; and both the geomagnetic sensor and the component for generating the magnetic noise are positioned on the same plane under at least any one of such conditions that both the first and second housings are closed and are opened.

With employment of the above-described structure, even in a portable terminal apparatus constructed in such a manner that two sets of the housings can be opened/closed, the geomagnetic sensor can sense the geomagnetism in high precision and thus can acquire the correct azimuth information, while eliminating the adverse influence of the magnetic noise caused by other components under at least any one of such conditions that the housings are closed and opened.

Also, a portable terminal apparatus, according to the present invention, is featured by such a portable terminal apparatus comprising: a geomagnetic sensor for sensing geomagnetism; and azimuth measuring means for acquiring azimuth information based upon the sensed geomagnetism, in which a plurality of housings are coupled to each other by way of a pivotable portion in such a manner that the plurality of housings can be opened/closed; both the geomagnetic sensor and a component for generating magnetic noise which gives an influence to a function of the geomagnetic sensor are arranged within the separate housings respectively; and both the geomagnetic sensor and the component for generating the magnetic noise are positioned on the same plane under at least any one of such conditions that both the plurality of housings are closed and are opened.

With employment of the above-described structure, even in a portable terminal apparatus constructed in such a manner that a plurality of the housings can be opened/closed, the geomagnetic sensor can sense the geomagnetism in high precision and thus can acquire the correct azimuth information, while eliminating the adverse influence of the magnetic noise caused by other components under at least any one of such conditions that the housings are closed and opened.

Also, the portable terminal apparatus is featured by that a shape of a rear surface of the housing in which the geomagnetic sensor is arranged is formed substantially parallel to the geomagnetic sensor.

With employment of the above-explained construction, in the case that the geomagnetic sensor is adjusted before the azimuth measuring operation is carried out, when the housing is set along the horizontal direction, the geomagnetic sensor may be similarly brought into the horizontal state. As a result, the horizontal state of the geomagnetic sensor can be readily obtained, so that the geomagnetic sensor can be adjusted and the azimuth measuring operation can be carried out in more correct manner.

Also, the portable terminal apparatus is featured by that the housing in which the geomagnetic sensor is arranged is made of a non-magnetic material.

With employment of the above-explained construction, since the housing is formed by such a non-magnetic material as a resin mold material, magnetization of the housing caused by the externally-applied magnetic force can be avoided, so that the adverse influence caused by the externally-applied magnetic field can be eliminated.

Also, the portable terminal apparatus is featured by that the geomagnetic sensor is provided within a housing equipped with an operation unit.

With employment of the above-described construction, when the user grips the portable terminal apparatus so as to manipulate the operation unit, since the direction of the geomagnetic sensor can be made stable, both the geomagnetism can be detected and the azimuth can be measured in more precise manners.

Further, the portable terminal apparatus is featured by such a portable terminal apparatus is comprised of an exclusively-used operation button capable of causing the geomagnetic sensor to function; and the operation button is provided with a function indication related to an azimuth measuring operation.

With employment of the above-explained construction, the geomagnetic sensor can be brought into the function condition by simply manipulating the exclusively-used operation button only one time. Also, this operation button owns superior visibly-recognizable characteristics, and thus, the user can readily recognize this function. As a consequence, the operation related to the azimuth measuring operation can be carried out in a simple manner.

It should be noted that in the drawings, a reference numeral 10 refers to a portable terminal apparatus; 11, 41, 61 to a first housing; 12, 42, 62 to a second housing; 13 to a hinge portion; 14 to a display unit; 15 to a receiver; 16 to an antenna; 17 to an operation unit; 18 to a microphone; 19 to a speaker; 19a to a magnet; 21 to a position-measuring mode button; 31 to a GPS receiving unit; 32 to a circuit board; 33 to a geomagnetic sensor; and 35 to a line of magnetic force.

BEST MODE FOR CARRYING OUT THE INVENTION

Referring now to drawings, embodiment modes of the present invention will be described.

In this embodiment mode, as a portable terminal apparatus, such an apparatus structural example is indicated, in which both a GPS receiving unit and a geomagnetic sensor are provided in a portable telephone used in a mobile communication system so as to acquire both positional information and azimuth information.

Figure 1:
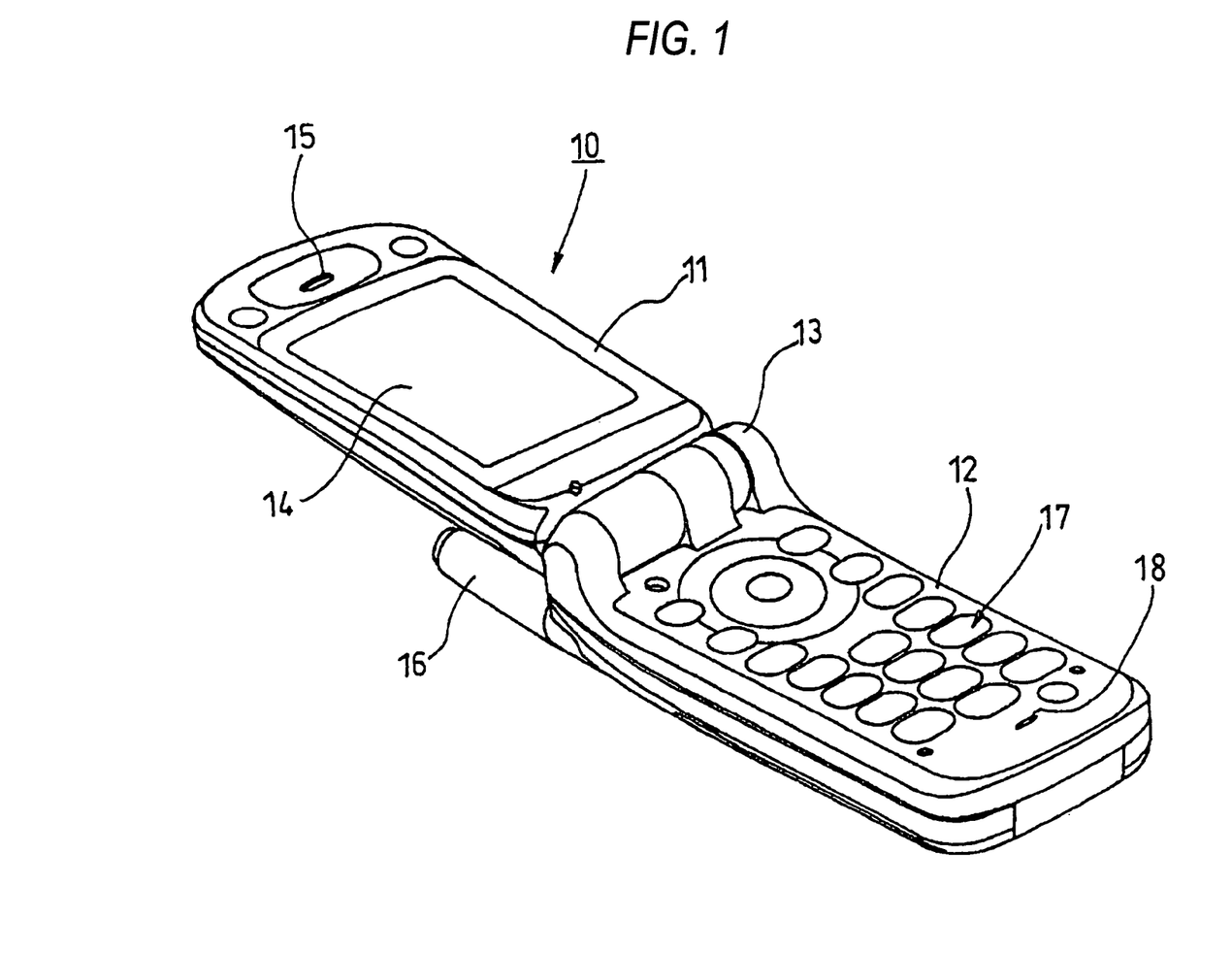
FIG. 1 is a perspective view for indicating an outer construction of a portable terminal apparatus according to a first embodiment mode of the present invention.
Figure 2:
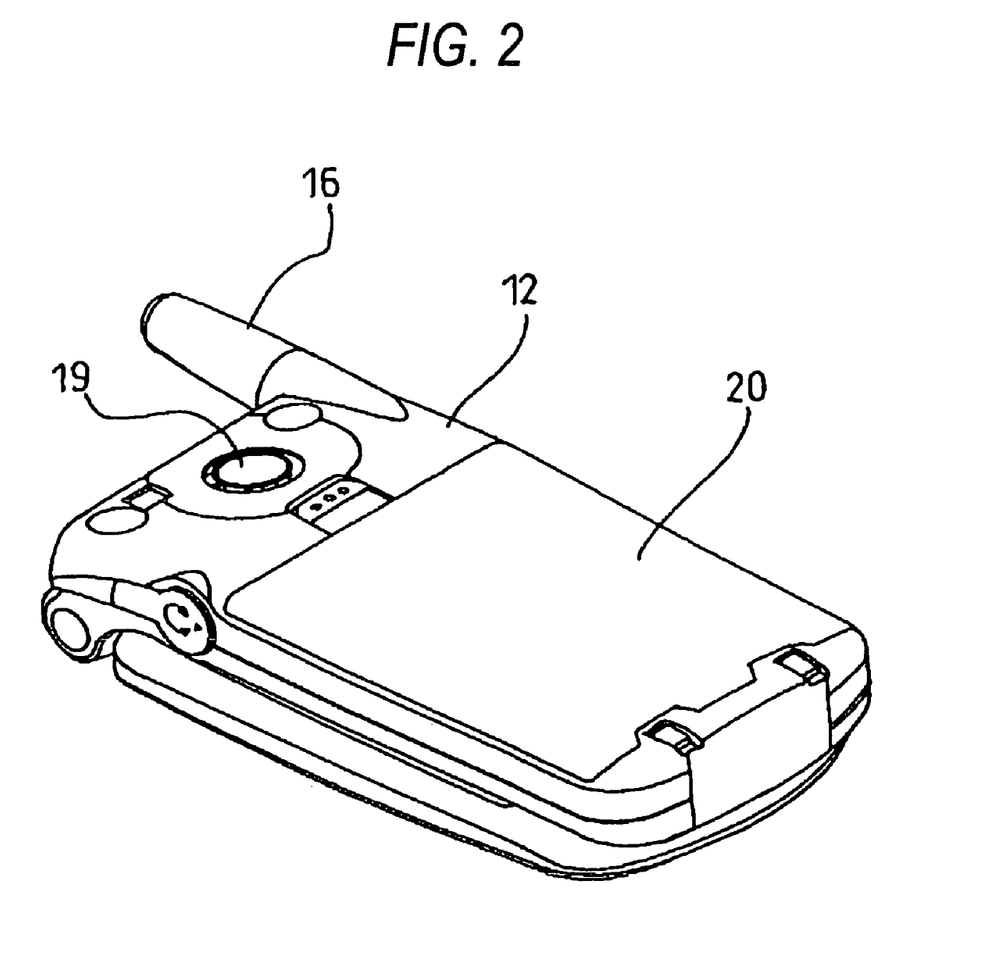
FIG. 2 is a perspective view for showing the portable terminal apparatus according to the first embodiment mode under such a condition that a housing of the portable terminal apparatus is closed and is viewed from a rear surface thereof.
Figure 3:
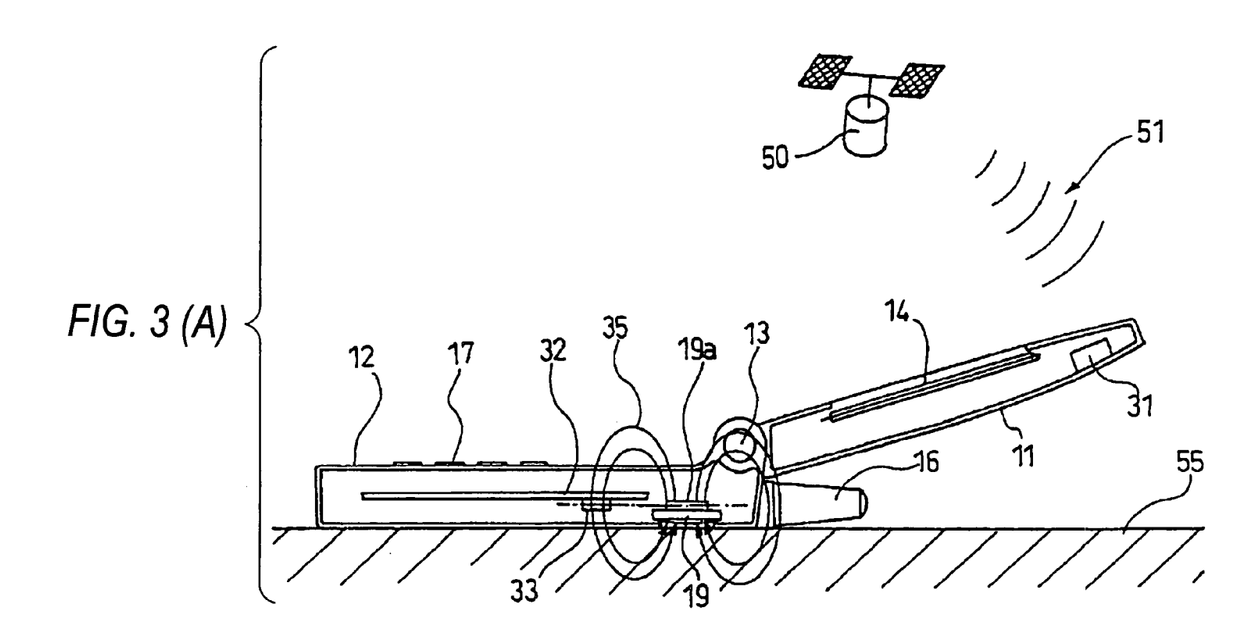
FIGS. 3(A) and 3(B) are explanatory diagrams for indicating a sectional view of an arranging structure of a major unit of the portable terminal apparatus according to the first embodiment mode.
Figure 4:
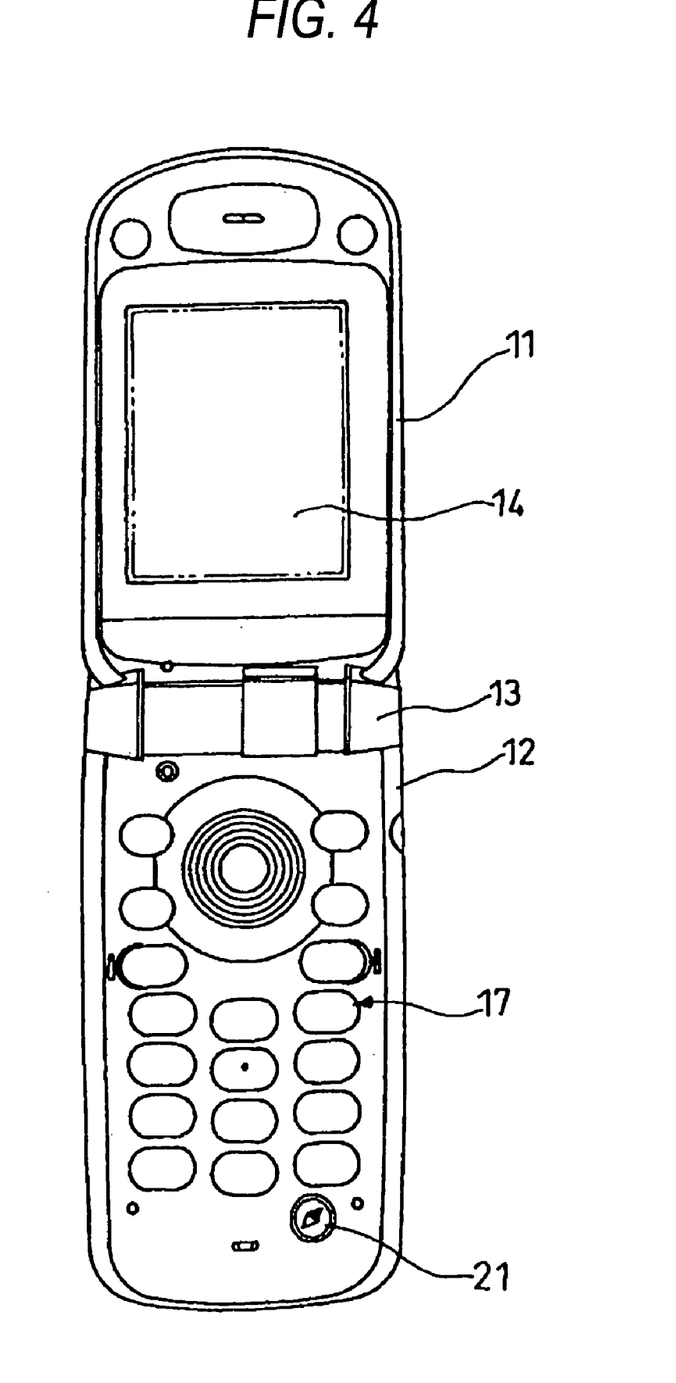
FIG. 4 is a plan view of the portable terminal apparatus according to the first embodiment mode under such a condition that this portable terminal apparatus is viewed from a front surface thereof.

FIG. 1 is a perspective view for indicating an outer construction of a portable terminal apparatus according to a first embodiment mode of the present invention. FIG. 2 is a perspective view for showing the portable terminal apparatus according to the first embodiment mode under such a condition that a housing of the portable terminal apparatus is closed and is viewed from a rear surface thereof. FIGS. 3(A) and 3(B) are explanatory diagrams for indicating a sectional view of an arranging structure of a major unit of the portable terminal apparatus according to the first embodiment mode. FIG. 4 is a plan view of the portable terminal apparatus according to the first embodiment mode under such a condition that this portable terminal apparatus is viewed from a front surface thereof.

As shown in FIG. 1, the portable terminal apparatus 10 is constituted in such a manner that both a first housing 11 and a second housing 12 are pivotably coupled to each other by a hinge portion 13 corresponding to a pivotable portion. The first housing 11 and the second housing 12 can be freely opened/closed when a user uses the portable terminal apparatus 10 for voice telephone communications and data communications, if necessary. Both a display unit 14 and a telephone reception-purpose receiver 15 are provided on the first housing 11. The display unit 14 is constructed of a liquid crystal display device (LCD) for performing various sorts of display operations while the portable terminal apparatus is operated. An antenna 16, an operation unit 17, a telephone talking-purpose microphone 18 are provided on the second housing 12. This antenna 16 is provided at an edge portion of this second housing 12 on the side of the hinge portion 13 in such a manner that this antenna 13 is elongated. Also, as shown in FIG. 1, under such a condition that this second housing 12 is opened, the operation unit 14 having various sorts of key buttons for operation purposes is provided on the side of a front plane (namely, inner plane side under such condition that second housing 12 is closed as shown in FIG. 2).

Also, as shown in FIG. 2, a speaker 19 is provided on an outer plane side of the second housing 12 under such a condition that the housings are closed, and a battery pack 20 for supplying electric power is mounted thereon. This speaker 19 produces ringing sound (telephone calling sound). The outer plane side corresponds to a rear plane side under such a condition that the housings are opened as shown in FIG. 1.

As indicated in FIG. 3(A), a GPS receiving unit 31 is provided on the first housing 11. The GPS receiving unit 31 is equipped with both a GPS antenna and a receiving circuit, which may receive a GPS signal 51 transmitted from a GPS satellite 50 so as to acquire positional information of the own portable telephone. Also, a geomagnetic sensor 33 for sensing geomagnetism is provided on a circuit board 32 in the second housing 12. The circuit board 32 mounts thereon a high frequency circuit, a baseband circuit, a control circuit, and the like, and is stored in this second housing 12. As this geomagnetic sensor 33, such a sensor is employed which is equipped with magnetic field detecting capabilities for two-axial components of the horizontal direction. This geomagnetic sensor constitutes an electronic azimuth meter functioning as an azimuth measuring means capable of detecting azimuth based upon the acquired geomagnetism. Based upon the positional information acquired by the above-explained GPS receiving unit 31 and the azimuth information acquired by the geomagnetic sensor 33, the positional information and a time instant may be displayed on the display unit 14 in combination with a map.

In the second housing 12, a speaker 19 is arranged in such a manner that this speaker 19 is directed to the rear plane side of the housing, while this speaker 19 corresponds to such a component for producing magnetic noise arranged in the vicinity of the geomagnetic sensor 33. The geomagnetic sensor 33 and a magnet 19a of the speaker 19 are arranged on the same plane (same height). In this case, assuming now that magnetic noise radiated from the magnet 19a of the speaker 19 is expressed by a magnetic force line 35, this magnetic force line 35 is is entered at a right angle with respect to the geomagnetic sensor 33. As a result, in this case, as indicated in FIG. 3(B), a tangential vector 36 of the magnetic force line 35 generated from the speaker 19 with respect to the geomagnetic sensor 33 contains only a vertical-direction vector component, but no horizontal-direction vector component. This portable telephone is constructed in such a manner that the magnetic noise which may give an adverse influence with respect to the geomagnetic sensor 33 is generated only along the vertical direction.

As a consequence, in this embodiment mode, the geomagnetic sensor 33 can correctly sense the two-axial components of the geomagnetism along the horizontal direction by this geomagnetic sensor 33 without receiving the adverse influence caused by the magnetic noise of the horizontal direction.

Also, the second housing 12 is made of a resin mold material such as ABS resin corresponding to a non-magnetic material in order that this second housing 12 is not magnetized by externally-applied magnetic force, so that an adverse influence of a magnetization given to the geomagnetic sensor 33 provided inside the second housing 12 may be reduced. Furthermore, since the geomagnetic sensor 33 is provided in the second housing 12 in which the operation unit 17 equipped with the various sorts of operation buttons has been employed, when the user grips the second housing 12 so as to manipulate the operation unit 17, the direction of the geomagnetic sensor 33 may become stable. Also, while a shape of a rear surface of the second housing 12 is made flat in order that the second housing 12 is horizontally mounted when the portable terminal apparatus 10 is positioned on a desk 55, the geomagnetic sensor 33 is provided substantially parallel to this rear surface. When the geomagnetic sensor 33 is horizontally set, both this geomagnetic sensor 33 and the magnet 19a of the speaker 19 are located on the same plane at the same height. As a result, since the second housing 12 is positioned on the horizontal plane, the geomagnetism can be sensed in higher precision.

When an azimuth measuring operation is carried out, the azimuth detection function (electronic azimuth meter) by way of the geomagnetic sensor 33 must be adjusted prior to the actual azimuth measurement. At this time, for instance, a sensor output of the geomagnetic sensor 33 is calibrated by rotating the housing two turns under such a condition that the geomagnetic sensor 33 is horizontally positioned. In this embodiment mode, the horizontal condition can be readily obtained due to the above-explained rear surface construction of the second housing 12 during adjusting operation, so that the electronic azimuth meter can be correctly and simply adjusted.

Also, as shown in FIG. 4, a position-measuring mode button 21 is provided on the operation unit 17 within the second housing 12. This position-measuring mode button 21 corresponds to such an operation button which exclusively causes the geomagnetic sensor 33 to function as an azimuth measuring operation, and also exclusively causes the GPS receiving unit 31 to detect the present position. A function indication is provided on the position-measuring mode button 21. This function indication indicates a position-measuring function such as a pictorial pattern of an azimuth magnet (compass). This function indication is made of such a design shape that the user can identify the function at a glance. Since this position-measuring mode button 21 is depressed, the display screen of the display unit 14 is switched to the position-measuring mode, and thus, the operation mode is advanced to the position-measuring mode related to the azimuth measuring operation by a single operation. In the position-measuring mode, the following measuring operations may be carried out, namely, a direction to which the own portable terminal is directed may be measured; a present position may be measured; a distance up to a communication counter party, or a preselected point, and a positional relationship between them may be measured etc. Then, measurement results may be displayed.

Figure 5:
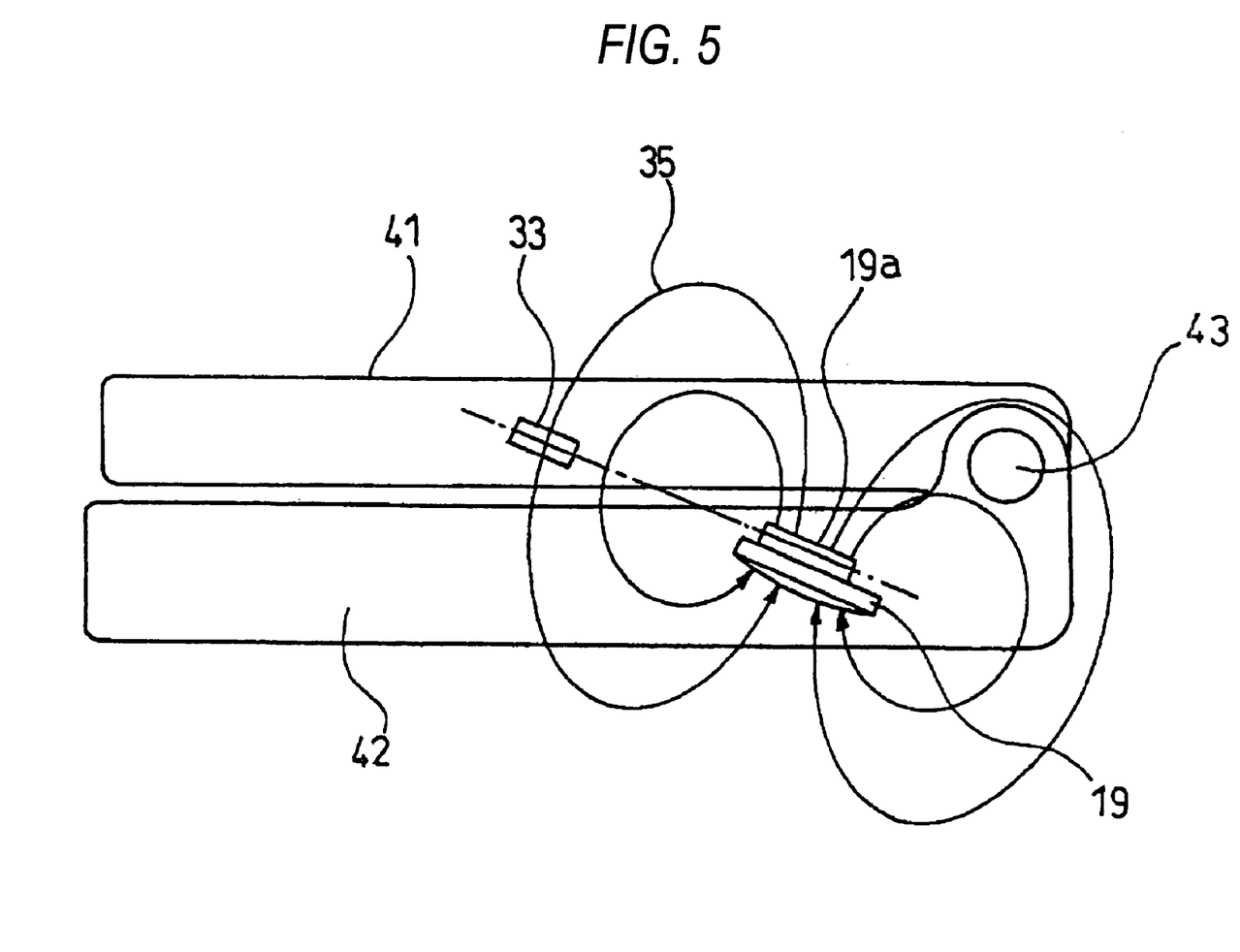
FIG. 5 is an explanatory diagram for representing a sectional view of an arranging structure of a portable terminal apparatus according to a second embodiment mode of the present invention under such a condition that two housings of this portable terminal apparatus are closed.
Figure 6:
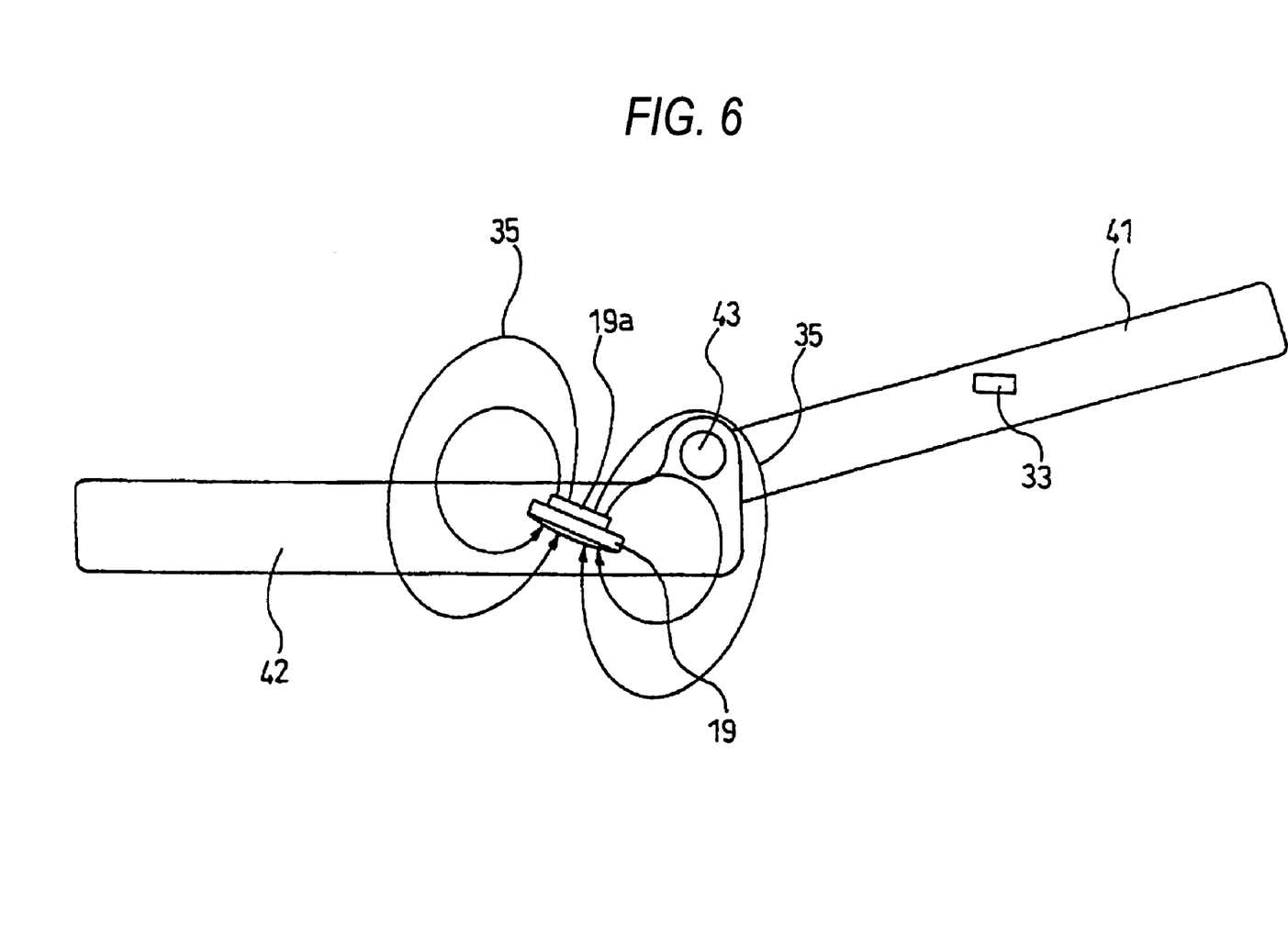
FIG. 6 is an explanatory diagram for representing a sectional view of an arranging structure of the portable terminal apparatus according to the second embodiment mode of the present invention under such a condition that the two housings of this portable terminal apparatus are opened.

FIG. 5 and FIG. 6 are explanatory diagrams for representing sectional views of arranging structures of a major unit of a portable terminal apparatus according to a second embodiment mode of the present invention. FIG. 5 indicates such a condition that two housings are closed, and FIG. 6 shows such a condition that the two housings are opened.

Similar to the first embodiment mode, the portable terminal apparatus of the second embodiment mode is arranged in such a manner that both a first housing 41 and a second housing 42 are pivotably coupled to each other by way of a hinge portion 43, and thus, these two housings 41 and 42 can be opened/closed. Then, the geomagnetic sensor 33 is provided with the first housing 41, whereas the speaker 19 is provided with the second housing 42, while this speaker 19 corresponds to a component for generating magnetic noise.

In the second embodiment mode, the portable terminal apparatus is arranged in such a manner that the geomagnetic sensor 33 is located in the vicinity of the speaker 19, and both the geomagnetic sensor 33 and the magnet 19a of the speaker 19 are located on the same plane under such a condition that both the first housing 41 and the second housing 42 are closed as indicated in FIG. 5. As a consequence, since the magnetic force line 35 produced from the magnet 19a of the speaker 19 is intersected with the geomagnetic sensor 33 at a right angle under such a condition that both the first and second housings are closed, the geomagnetic sensor 33 can correctly sense geomagnetism without any adverse influence caused by the magnetic noise generated from the speaker 19.

Also, as represented in FIG. 6, under such a condition that both the first housing 41 and the second housing 42 are opened, such a construction is established in which the geomagnetic sensor 33 is separated far from the speaker 19.

As a consequence, while the magnetic force line 35 generated from the magnet 19a of the speaker 19 gives no adverse influence to the geomagnetic sensor 33, the geomagnetic sensor 33 can correctly sense the geomagnetism without any adverse influence caused by the magnetic noise.

Figure 7:
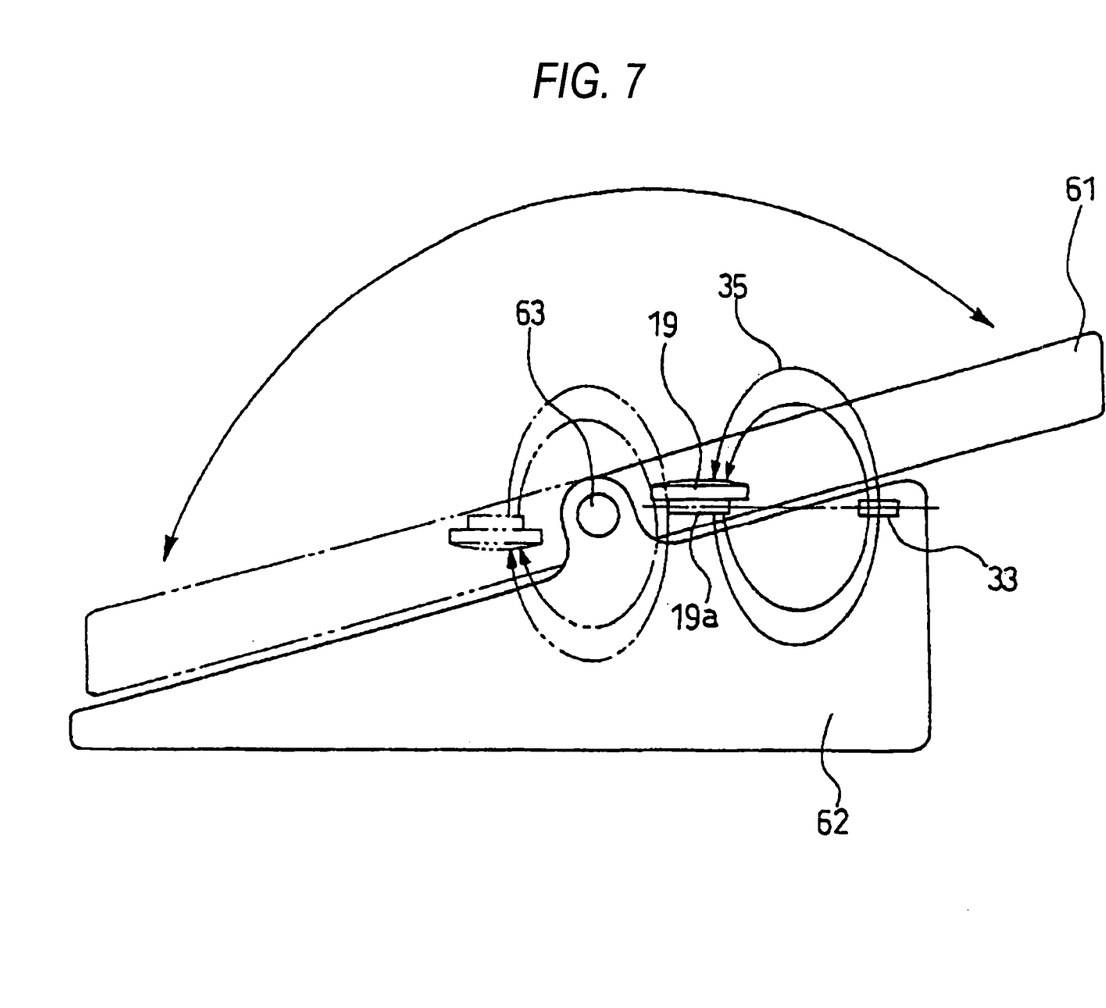
FIG. 7 is an explanatory diagram for indicating a sectional view of an arranging structure of a major unit of a portable terminal apparatus according to a third embodiment mode.

FIG. 7 is an explanatory diagram for representing a sectional view of an arranging structure of a major unit of a portable terminal apparatus according to a third embodiment mode of the present invention.

Similar to the first embodiment mode, the portable terminal apparatus of the third embodiment mode is arranged in such a manner that both a first housing 61 and a second housing 62 are pivotably coupled to each other by way of a hinge portion 63, and thus, these two housings 61 and 62 can be opened/closed. Then, the speaker 19 is provided with the first housing 61, while this speaker 19 corresponds to a component for generating magnetic noise, whereas the geomagnetic sensor 33 is employed in the second housing 62. In the third embodiment mode, the portable terminal apparatus is arranged in such a manner that the geomagnetic sensor 33 is located in the vicinity of the speaker 19, and both the geomagnetic sensor 33 and the magnet 19a of the speaker 19 are located on the same plane under such a condition that both the first housing 61 and the second housing 62 are opened, as indicated by a solid line of FIG. 7. Also, as shown by a two-dot/dash line of FIG. 7, under such a condition that both the first housing 61 and the second housing 62 are closed, the portable terminal apparatus is constructed by that the geomagnetic sensor 33 is separated far from the speaker 19, and thus, there is no adverse influence caused by the magnetic field.

As previously explained, similar to the above-described second embodiment mode, also in this third embodiment mode, under such a condition that both the first and second housings are opened and closed, the geomagnetic sensor 33 can correctly sense geomagnetism without any adverse influence caused by the magnetic noise generated from the speaker 19.

It should be understood that in the above-described second and third embodiment modes, such a construction has been shown. That is, both the geomagnetic sensor and the component for generating the harmful magnetic noise such as the speaker are arranged on the same plane under any one of such conditions that the first and second housings are opened and closed. Alternatively, both the geomagnetic sensor and the speaker may be positioned on the same plane under both conditions that the first and second housings are opened and closed.

Also, in the case that magnetic adverse influences are given which are caused by not only a speaker but also any other components such as a receiver and a microphone as the components for generating the harmful magnetic noise, this embodiment mode is similarly applied thereto, and thus, the components and the geomagnetic sensor are arranged on the same plane so as to cancel magnetic force line components along the horizontal direction with respect to the geomagnetic sensor, so that the adverse influence of the magnetic noise other than the geomagnetism can be eliminated.

In accordance with the above-described construction of this embodiment mode, in the compact portable terminal apparatus in which a large number of components are arranged under such a condition that these components are located in proximity to each other in high density, the magnetic adverse influence caused by the component for generating the magnetic noise such as the speaker can be eliminated with respect to the geomagnetic sensor. As a result, the portable terminal apparatus can detect the geomagnetism in high precision to correctly acquire the azimuth information. Also, since the geomagnetic sensor is arranged within the housing made of the non-magnetic material such as the resin mold member, it is possible to avoid that the housing is magnetized by the externally-applied magnetic force while the portable terminal apparatus is carried by the user, so that the high-precision geomagnetic sensing operation can be carried out without adverse influences caused by the externally-applied magnetic field.

Also, the shape of the rear surface of such a housing for arranging therein the geomagnetic sensor is formed in such a manner that when the housing is mounted on the desk, or the like, this rear surface may be horizontally located, and both this rear plane of the housing and the geomagnetic sensor are located substantially parallel to each other. As a result, since the geomagnetic sensor may be easily set to the horizontal condition by merely setting the housing along the horizontal direction, the geomagnetic sensor can be more correctly adjusted, and also, the azimuth can be more correctly measured.

While the present invention has been described in detail, or with reference to the specific embodiment modes, however, the present invention may be apparently modified, changed, and substituted without departing from the technical scope and spirit of the present invention by those skilled in the art.

The present invention has been made based upon Japanese Patent Application NO. 2002-83840 filed on Mar. 25, 2002, by incorporating the contents thereof as a reference.

INDUSTRIAL APPLICABILITY

As previously described, in accordance with the present invention, while the adverse influence of the magnetic noise is eliminated with respect to the geomagnetic sensor provided in the housing, the high-precision geomagnetism detection can be carried out, and also, the correct azimuth information can be acquired.

The invention claimed is:

1. A portable terminal apparatus having a geomagnetic sensor for sensing geomagnetism and azimuth measuring means for acquiring azimuth information based upon the sensed geomagnetism,
   wherein both said geomagnetic sensor and a component for generating magnetic noise are arranged on the same plane within the same housing, while said magnetic noise generating component is positioned in the vicinity of said geomagnetic sensor and gives an influence to a function of said geomagnetic sensor.

2. The portable terminal apparatus as set forth in claim 1, wherein the geomagnetic sensor and the component for generating magnetic noise are arranged on the same plane within the same housing so that the magnetic noise generated form the component is vertically entered into the geomagnetic sensor so as not to give an influence to a function of said geomagnetic sensor.

3. A portable terminal apparatus having a geomagnetic sensor for sensing geomagnetism and azimuth measuring means for acquiring azimuth information based upon the sensed geomagnetism,
   wherein both a first housing and a second housing are coupled to each other by way of a hinge portion in such a manner that said first and second housings can be opened/closed, and
   wherein said geomagnetic sensor is arranged within said first housing, a component for generating magnetic noise which gives an influence to a function of said geomagnetic sensor is arranged within said second housing, and both said geomagnetic sensor and said component for generating the magnetic noise are positioned on the same plane under at least any one of such conditions that both said first and second housings are closed and are opened.

4. The portable terminal apparatus as set forth in claim 3, wherein the geomagnetic sensor and the component for generating magnetic noise are arranged on the same plane within the same housing so that the magnetic noise generated form the component is vertically entered into the geomagnetic sensor so as not to give an influence to a function of said geomagnetic sensor.

5. A portable terminal apparatus having a geomagnetic sensor for sensing geomagnetism and azimuth measuring means for acquiring azimuth information based upon the sensed geomagnetism,
   wherein a plurality of housings are coupled to each other by way of a pivotable portion in such a manner that said plurality of housings can be opened/closed, and
   wherein both said geomagnetic sensor and a component for generating magnetic noise which gives an influence to a function of said geomagnetic sensor are arranged within the separate housings respectively, and both said geomagnetic sensor and said component for generating the magnetic noise are positioned on the same plane under at least any one of such conditions that both said plurality of housings are closed and are opened.

6. The portable terminal apparatus as set forth in claim 5, wherein the geomagnetic sensor and the component for generating magnetic noise are arranged on the same plane within the same housing so that the magnetic noise generated form the component is vertically entered into the geomagnetic sensor so as not to give an influence to a function of said geomagnetic sensor.

7. The portable terminal apparatus as claimed in any one of claim 1 to claim 5,
wherein a shape of a rear surface of the housing in which said geomagnetic sensor is arranged is formed substantially parallel to said geomagnetic sensor.

8. The portable terminal apparatus as claimed in any one of claim 1 to claim 5,
wherein the housing in which said geomagnetic sensor is arranged is made of a non-magnetic material.

9. The portable terminal apparatus as claimed in any one of claim 1 to claim 5,
wherein said geomagnetic sensor is provided within a housing equipped with an operation unit.

10. The portable terminal apparatus as claimed in any one of claim 1 to claim 5, further comprising:
an exclusively-used operation button capable of causing said geomagnetic sensor to function,
wherein said operation button is provided with a function indication related to an azimuth measuring operation.

* * * * *